R. HUFF.
HANGER FOR CAR DOORS.
APPLICATION FILED AUG. 23, 1913.
1,117,492.
Patented Nov. 17, 1914.
2 SHEETS—SHEET 2.
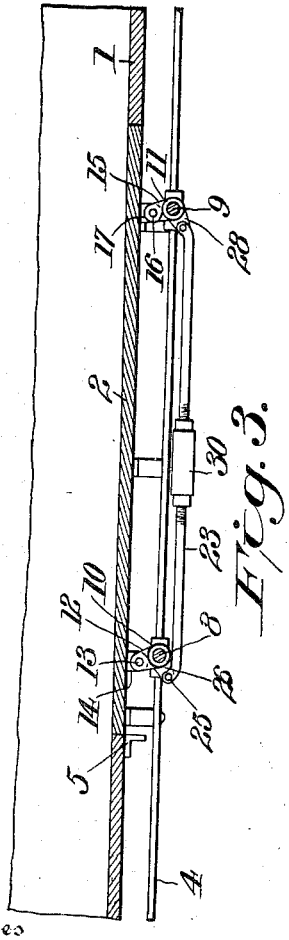
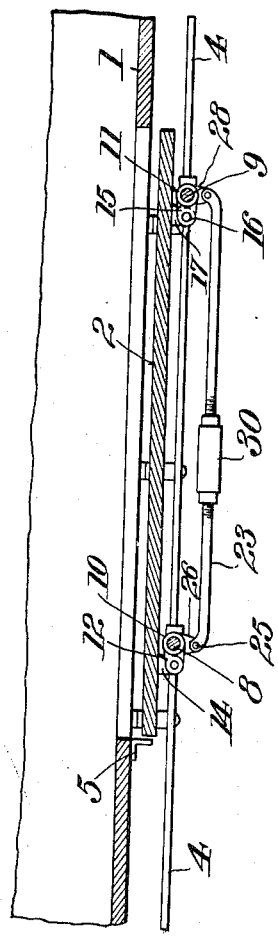
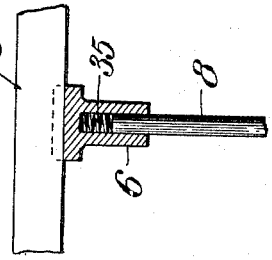

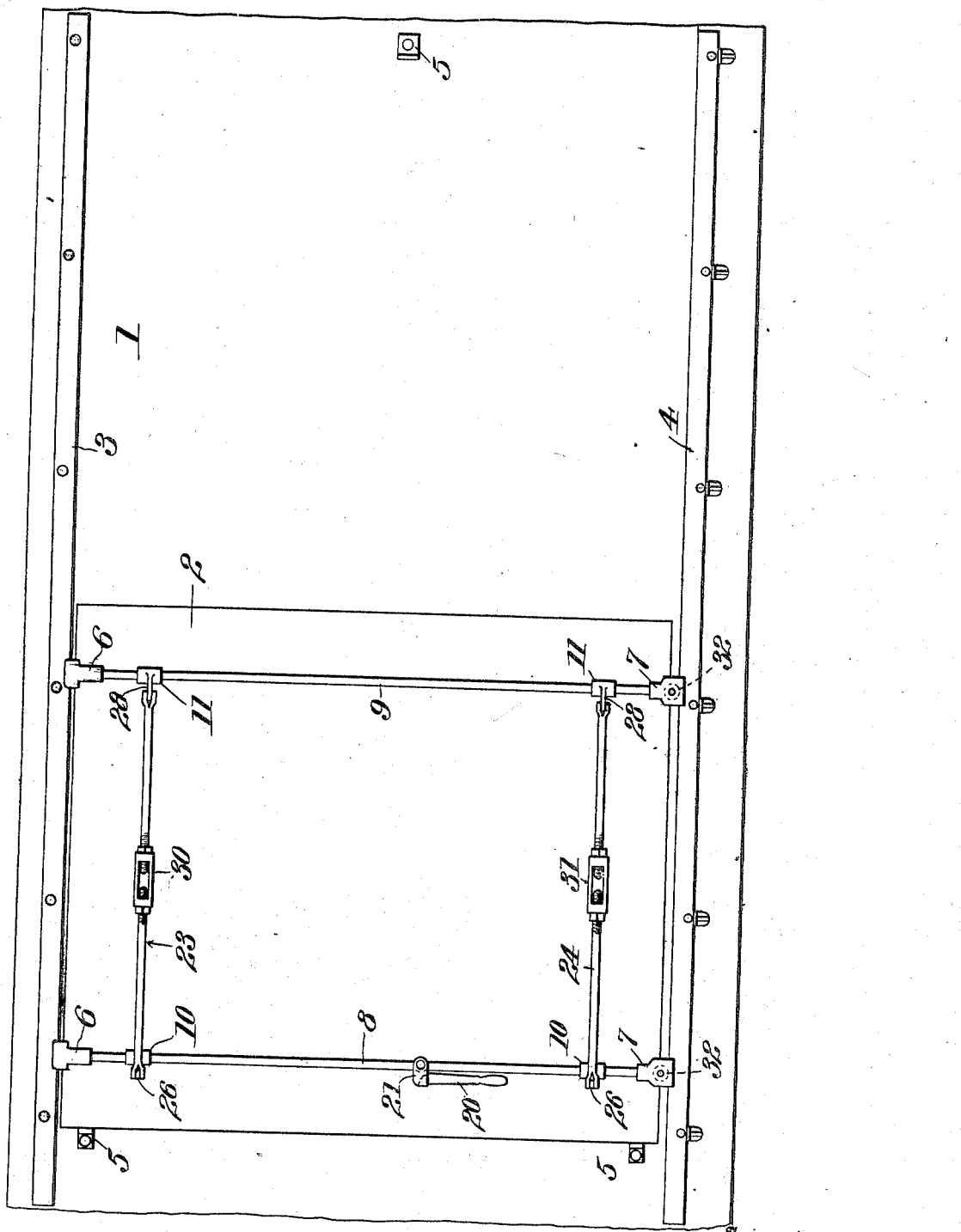

UNITED STATES PATENT OFFICE.

ROBERT HUFF, OF PASSAIC, NEW JERSEY, ASSIGNOR TO THE BOX CAR FLUSH DOOR COMPANY, OF NEW YORK, N. Y., A CORPORATION OF NEW YORK.

HANGER FOR CAR-DOORS.

1,117,492.  Specification of Letters Patent.  Patented Nov. 17, 1914.

Application filed August 23, 1913. Serial No. 786,319.

*To all whom it may concern:*

Be it known that I, ROBERT HUFF, a citizen of the United States, residing at Passaic, in the county of Passaic and State of New Jersey, have invented certain new and useful Improvements in Hangers for Car-Doors, and I do hereby declare the following to be a full, clear, and exact description of the invention, such as will enable others skilled in the art to which it appertains to make and use the same.

This invention relates to hangers for car doors, and has for its object to provide a device of this nature which will be comparatively inexpensive to construct, and more simple and efficient in action than those heretofore proposed.

With these and other objects in view the invention consists in the novel details of construction and combinations of parts more fully hereinafter disclosed and particularly pointed out in the claims.

Referring to the accompanying drawings forming a part of this specification, in which like numerals designate like parts in all the views:—

Figure 1 is a side elevational view of the side wall of a car with my door hanger applied thereto; Fig. 2 is a sectional view of the parts shown in Fig. 1, showing the door in its closed position; Fig. 3 is a view similar to Fig. 2, but showing the door in its open position; Fig. 4 is a detail view of a spring controlled guide; and Fig. 5 is a diagrammatic view of a slightly modified form of my invention.

1 indicates the side wall of a car; 2, a sliding door; 3, an upper guide rail; 4, a lower guide rail; and 5, stops for the door; 6, upper guides mounted on the door for engagement with the upper rail 3; and 7, lower guides mounted on the door for engagement with the lower rail 4.

Extending between the guides 6 and 7 are the vertical rods 8 and 9 to which are attached the pairs of collars or sleeves 10 and 11, respectively. Rigid with the said collars 10 are the bell-crank arms 12 pivoted as at 13 to the brackets 14 rigid with the car door, and rigid with the collars 11 are similar bell-crank arms 15 pivoted as at 16 to the brackets 17 likewise rigid with the car door. The said collars 10 and 11 are rigid with their respective rods 8 and 9, so that when the said rods 8 and 9 are turned on their vertical axes, as by the lever 20, secured to the rod 8 by means of the bracket 21, the said bell-crank arms will be turned from the position shown in Fig. 2 to that shown in Fig. 3, so that the door 2 will be removed from its position flush with the walls 1 of the car shown in Fig. 2 to the position out of line with said walls, as shown in Fig. 3.

In order to facilitate the turning of the rods 10 and 11 upon their axes, I provide the cross or stay bars 23 and 24, provided with the turn buckles 30 and 31, respectively. The left hand ends, as seen in the drawings, of the rods 23 and 24, are pivoted as at 25 to the bell-crank arms 26, which are likewise rigid with the collars 10, and which are located at about ninety degrees from the arms 12, as will be clear from Figs. 2 and 3. The right hand ends of the rods 23 and 24, as seen in the drawings, are similarly pivoted to arms 28 rigid with the collars 11, and these said arms 28 are positioned substantially at right angles to the arms 15 on said collars. It, therefore, results that any power which may be applied through the lever 20 to the rod 8 will be transmitted to the bell-crank arms 26, and through them to the rods 23 and 24 and to the bell-crank arms 28, which in turn will transmit it to the collars 11 and to the rod 9 and bell-crank arms 15. The turning of the bell-crank arms 12 and 15 in the manner just described, of course, forces the door from its flush position, shown in Fig. 2, to its non-registering position shown in Fig. 3. Further, it will be observed that not only is the power transmitted through the rods 23 and 24 from the rod 8 to the rod 9, but it is also transmitted through the door itself to the pivots 16 associated with the rod 9, and therefore the strains are completely equalized all around, and the motion is an exceedingly easy and smooth one. The weight of the door is carried upon the rollers 32 with which the lower guides 7 are provided, and the said rods 8 and 9 turn upon their axes in said guides, as will be readily understood. The said rods 8 and 9 further turn upon their axes in the upper guides 6, and these last-mentioned guides, as best shown in Fig. 4, are provided with springs 35 to maintain the said guides always in contact with the upper guide rail 3. When the door is brought from the position shown in Fig. 2 to the position shown in Fig. 3, a further movement of the handle 20 readily slides the door upon the track 4 to the rear until it comes in contact with the back stop 5.

The advantages of the structure just described, will be apparent when it is said that, ordinarily, the tracks for a car door must be accurately spaced apart, and generally by the use of gages. By providing spring-controlled guides 6, however, I render this accurate spacing unnecessary, while at the same time maintain a positive contact between the door and its side tracks. Further, by carrying the weight of the door on the bottom track instead of on the top track, and by applying the power as indicated, a straight thrust is had which does not have the tendency to cant the door and bind it between the tracks. In other words, there being merely the spring-controlled connection at the top, and all of the weight being located near the bottom, it is a comparatively easy matter to slide the door along the lower track while the top track and its connections merely serve as a guide. The advantage of this particular construction will be further apparent when it is said that should the door be hung from the top track, for example, and should the top track be say an inch higher or lower than it should be, which is not an uncommon deviation after the cars have been subjected to right usage for several years, then upon attempting to shove the door backward and forward, the power being applied as is ordinarily done, the said door will be canted, and the opposite corner will rise or lower, as the case may be, thus giving the door an abnormal position in its supports, and causing the corners to bind, giving rise to all sorts of trouble. In my construction on the other hand, these troubles are obviated, and by providing the cross rods 23 and 24 between the bell-cranks themselves instead of connecting the lower brackets 14 and 17 with such rods, the power is applied directly and positively from the vertical rod 8 to the vertical rod 9, so that the door is not only pulled outwardly with an even strain all around, but it is rigidly braced and acts as a single unit, the center of gravity of which is about opposite the point of application of the power through the lever 20, and therefore the above unsatisfactory results do not follow. Again, by causing the bell-crank arms 12 and 15 to occupy a position at substantially right angles to the door when in its closed position, the door is moved bodily outward from the wall 1 so that it is not necessary to bevel the corners of the door or of the car wall in order to get a perfect fit. This is an important feature in the fitting of car doors, because any sharp or beveled corners are liable to be broken off, marred or destroyed under the rough usage to which cars are subjected, and in time, such beveled edges are sure to produce a loose joint and an imperfect closure.

A further important feature of the invention resides in the fact that the top connections being under control of a spring, may be readily pulled down by hand, and the door snapped into place or snapped out of place without removing the front or back stops 5. In other words, it is not necessary to leave the end of the tracks 3 and 4 open in order to put the door in place or to remove the same, but on the other hand, should it be desired to enter the door between the open ends of said tracks, these said spring guides being adjustable renders the operation easier and simpler than would otherwise be the case. Further, owing to these said spring guides, I am enabled to make the upper guide rail 3 of a simple and solid construction, and thereby avoid the special construction required by an overhead-hang.

In the modified form of construction shown in Fig. 5, the parts are all the same as illustrated in Figs. 1 to 4, but I have omitted the connecting rods 23 and 24, as well as the bell-crank arms 26 and 28, thus causing the power to be transmitted from the lever 20 through the arm 8, the bell-crank arms 14, and the door itself to the brackets 17 and the bell-crank arms 15. This construction, however, although cheaper, I do not regard as efficient as the preferred form illustrated in Figs. 1 to 4.

It is obvious that those skilled in the art may vary the arrangements of parts as well as the details of construction without departing from the spirit of my invention and therefore I do not wish to be limited to the above disclosure, except as may be required by the claims.

What I claim is:—

1. In a car door hanger the combination of upper and lower guide rails; a pair of lower supporting guides for said door running on the lower rail; a pair of upper guides running along the upper rail; a pair of vertically disposed rods connecting said upper and lower guides and adapted to turn in the same; a bell crank rigid with each of said vertical rods; a connection between one arm of each bell crank and said door; a cross rod extending between said pair of rods and connected to the other arm of each bell crank; and means for rotating one of said vertical rods on its longitudinal axis, substantially as described.

2. In a car door hanger the combination of upper and lower guide rails; lower supporting guides for said door running on the lower rail; upper guides running along the upper rail; vertically disposed rods connecting said upper and lower guides and adapted to turn in the same; a plurality of bell-crank arms connecting each of said vertical rods and said door; a plurality of cross rods connecting the other bell-crank arms on one vertical rod with the other bell-crank arms on the other vertical rod; means for adjusting the length of said cross rods; and means for rotating one of said vertical rods on its longitudinal axis, substantially as described.

3. In a car door hanger the combination of upper and lower guide rails; lower supporting guides provided with rollers running on the lower rail; upper spring controlled guides running on the upper rail; vertically disposed rods connecting said upper and lower guides; arms pivotally connecting each vertical rod with the door; additional arms associated with said first mentioned arms; cross rods pivotally connected between the said additional arms associated with one of said vertical arms and the additional arms associated with the other of said vertical arms; and means for turning one of said vertical rods on its axis, substantially as described.

In testimony whereof I affix my signature, in presence of two witnesses.

ROBERT HUFF.

Witnesses:
ERNEST REMIG, Jr.,
IRA J. BOGERT.